United States Patent [19]

Southwell et al.

[11] Patent Number: 5,000,575
[45] Date of Patent: Mar. 19, 1991

[54] METHOD OF FABRICATING GRADIENT INDEX OPTICAL FILMS

[75] Inventors: William H. Southwell, Thousand Oaks; Randolph L. Hall, Newbury Park, both of Calif.

[73] Assignee: Rockwell International Corporation, El Segundo, Calif.

[21] Appl. No.: 403,649

[22] Filed: Sep. 6, 1989

[51] Int. Cl.⁵ .................. G01B 11/06; G01N 21/86
[52] U.S. Cl. ............................ 356/382; 356/381; 250/560
[58] Field of Search ............... 356/128, 132, 361, 355, 356/381–382, 445, 448; 350/164, 166; 427/10, 162, 167, 38–39; 118/719, 726–727

[56] References Cited

U.S. PATENT DOCUMENTS

| | | | |
|---|---|---|---|
| 3,892,490 | 7/1975 | Uetsuki et al. | 356/161 |
| 4,555,767 | 11/1985 | Case et al. | 364/563 |
| 4,676,646 | 6/1987 | Strand et al. | 356/381 |
| 4,707,611 | 11/1987 | Southwell | 356/382 |
| 4,756,602 | 7/1988 | Southwell et al. | 350/166 |
| 4,778,251 | 10/1988 | Hall et al. | 350/166 |
| 4,787,749 | 11/1988 | Ban et al. | 356/382 |
| 4,826,267 | 5/1989 | Hall et al. | 350/1.6 |
| 4,837,044 | 6/1989 | Murarka et al. | 427/162 |
| 4,902,902 | 2/1990 | Tole | 356/382 |
| 4,925,259 | 5/1990 | Emmett | 350/1.6 |

OTHER PUBLICATIONS

Macleod, H. A., *Thin–Film Optical Filters*, 2d ed., 423–445, (MacMillan, 1986).

Primary Examiner—Richard A. Rosenberger
Assistant Examiner—Hoa Pham
Attorney, Agent, or Firm—John C. McFarren

[57] ABSTRACT

A method is provided for monitoring and controlling the deposition of an optical thin film having a refractive index gradient. The optical material to be deposited is evaporated at a controllable rate. In a coevaporation process, evaporation of material having a lower index of refraction is generally held at a predetermined rate while evaporation of material having a higher index of refraction is controllable. During deposition, the film and substrate are illuminated by a broadband light source. The incident light reflected by the film and substrate produces an interference pattern comprising a reflectance spectrum that is detected to compute an optical thickness estimate of the film. The detected reflectance is compared to a reflectance specified for that optical thickness by a predetermined refractive index profile of the desired film. The controllable rate of evaporation is then adjusted so that the refractive index of the material being deposited conforms to the predetermined profile.

2 Claims, 3 Drawing Sheets

METHOD OF FABRICATING GRADIENT INDEX OPTICAL FILMS

GOVERNMENT RIGHTS

The United States Government has rights in this invention under contract and F33615-86-C-5123 awarded by the Department of the Air Force.

TECHNICAL FIELD

This invention relates to the fabrication of optical thin film coatings and, in particular, to a method of monitoring optical thickness during deposition of a thin film having a refractive index gradient.

BACKGROUND OF THE INVENTION

Optical coatings make use of the principles of optical interference, which deal with modifications in the transmitted and reflected intensities of light that occur when two or more beams of light are superimposed. For example, the brilliant colors that are seen when light is reflected from a thin layer of oil floating on water are produced by interference effects between the light waves reflected at opposite surfaces of the thin film of oil.

One important practical application of thin films involves the production of coated optical surfaces. If a film of a transparent substance having an appropriate thickness and refractive index is deposited on a lens, for example, the reflection of particular wavelengths of light from the lens surface can be almost completely suppressed. The light that otherwise would be reflected is not absorbed by such an antireflecting film; rather, the energy in the incident light is redistributed so that a decrease in reflection is accompanied by a corresponding increase in the intensity of the light that is transmitted. The beneficial effects of thin film coatings, such as antireflection, are so desirable that substantially all high quality optical components are provided with optical coatings.

As optical coating technology has developed, improvements have been achieved through the introduction of multiple layer films. Two different materials are typically used in fabricating multiple layer films, one with a relatively high index of refraction and the other with a relatively low index of refraction. The two materials are alternately deposited in a controlled sequence of thicknesses to obtain the desired optical characteristics for the film. The deposition process is typically controlled by monitoring the thickness of each layer as it is deposited and by terminating the deposition when the layer reaches the correct thickness. This approach provides the flexibility to design a wide range of multiple layer interference coatings for various transmission and reflection spectra. As a result, complex spectral filter structures have been added to many new optical devices. Antireflection coatings, laser dielectric mirrors, television camera edge filters, optical bandpass filters, and band-rejection filters are some of the examples of useful devices employing multilayer thin film interference coatings.

Some advanced applications of optical technology, however, have performance requirements that exceed the capabilities of multiple layer thin films. New optical design procedures have been developed for these advanced applications to predict the continuous refractive index profile required for any desired transmission or reflection spectrum. These design techniques employ gradient index layers, in which the index of refraction varies continuously as a function of depth into the layer. Gradient index optical coatings have advantages over conventional technologies, including flexibility in filter design and increased stability in adverse environments. For example, the absence of discrete interfaces is predicted to lead to greater resistance to laser damage.

One type of gradient index structure is the rugate filter, the simplest manifestation of which has a periodic refractive index that varies sinusoidally with respect to optical thickness. A rugate filter is a gradient index analog of a quarterwave stack reflector. Compared to a quarterwave stack, a rugate filter has greatly suppressed high-frequency reflection harmonics. The rugate structure provides high reflectivity within a narrow bandwidth simply by increasing the number of periods in the filter.

Practical realizations of the rugate and other gradient index structures have been inhibited by the limitations of thin film fabrication technology. These limitations make it difficult to ensure that a fabricated coating accurately implements the theoretically specified refractive index profile. One prior method described in U.S. Pat. No. 4,707,611, which is incorporated herein by reference, measures the reflectance of two different wavelengths of light to determine the thickness and refractive index of an incremental thin film layer deposited on a base stack of layers. However, when a coating specification calls for a continuous refractive index profile, the thickness monitoring techniques of the prior art do not provide sufficient accuracy to ensure that the deposited layers will conform reliably to the specified profile. A slight error in the deposition thickness of a portion of a rugate filter, for example, can introduce a phase shift that may have a significant detrimental effect on the filter spectral structure. Also, an error in the refractive index of such a filter will add additional frequency components to the spectral profile, resulting in the generation of unwanted sidebands in the transmittance or reflectance spectrum. It is very difficult to compensate for such perturbations by any changes in the deposition of the remaining portion of the filter. Consequently, a need has developed in the art for an improved method of monitoring and controlling the deposition of optical thin films having continuous refractive index profiles.

SUMMARY OF THE INVENTION

The present invention comprises a method of monitoring the optical thickness of a thin film having a refractive index gradient. Typically, the thin film is deposited on a substrate such as glass while a silicon chip is used as a substrate for purposes of monitoring the thin film deposition.

The broadband spectral monitor of the present invention includes a broadband light source that directs light onto the deposition monitoring chip. Light reflected by the monitoring chip is received by a monochrometer that measures the reflectance spectrum. A computer detects turning points in the reflectance spectrum that are produced by interference between the light reflected by the top surface of the thin film and the light reflected by the interface of the thin film with the substrate. The reflectance spectrum input to the computer is fit to a single layer model to produce an optical thickness estimate. The optical thickness estimate is obtained by minimizing the deviation between the measured reflectance and the single layer model. The reflectance spectrum turning points detected by the computer are used to stabilize the optical thickness estimate. Each detected turning point represents an additional quarter-wave optical thickness at that wavelength of incident light.

To produce a refractive index gradient in a thin film structure, the deposition process may involve control of codeposition rates of different materials or periodic modification of the deposition rate of a single evaporant. A control system monitors evaporation rates and commands rate changes to achieve a thin film composition having the desired refractive index gradient. The broadband spectral monitor provides total optical thickness data for input to the evaporation rate control system.

BRIEF DESCRIPTION OF THE DRAWINGS

For a more complete understanding of the present invention and for further advantages thereof, the following Detailed Description makes reference to the accompanying Drawings, in which.

DETAILED DESCRIPTION OF THE INVENTION

In depositing a high performance optical coating with a continuously variable refractive index, it is of primary importance to control the refractive index of the coating precisely as a function of thickness of the coating. The refractive index of the coating, however, is difficult to measure while the coating is being deposited. Therefore, an alternative parameter of the coating, such as its optical thickness, is measured, and the corresponding refractive index is calculated from a known relationship with the measured parameter.

Figure 1:
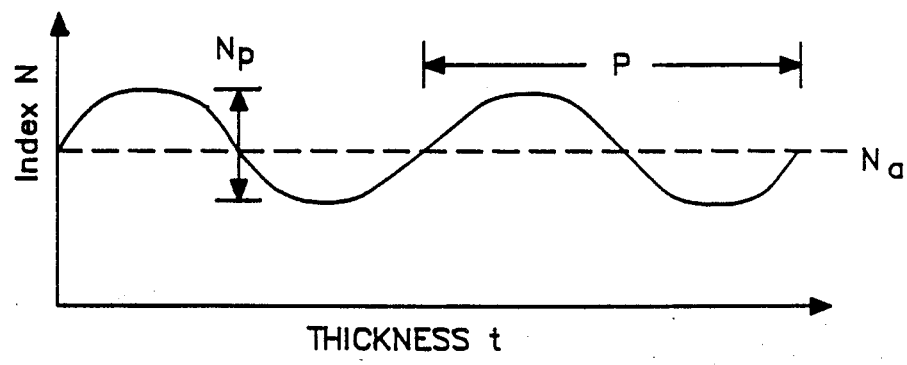
FIG. 1 is a graph plotting refractive index as a function of thickness for a small portion of an ideal rugate filter.
Figure 2:
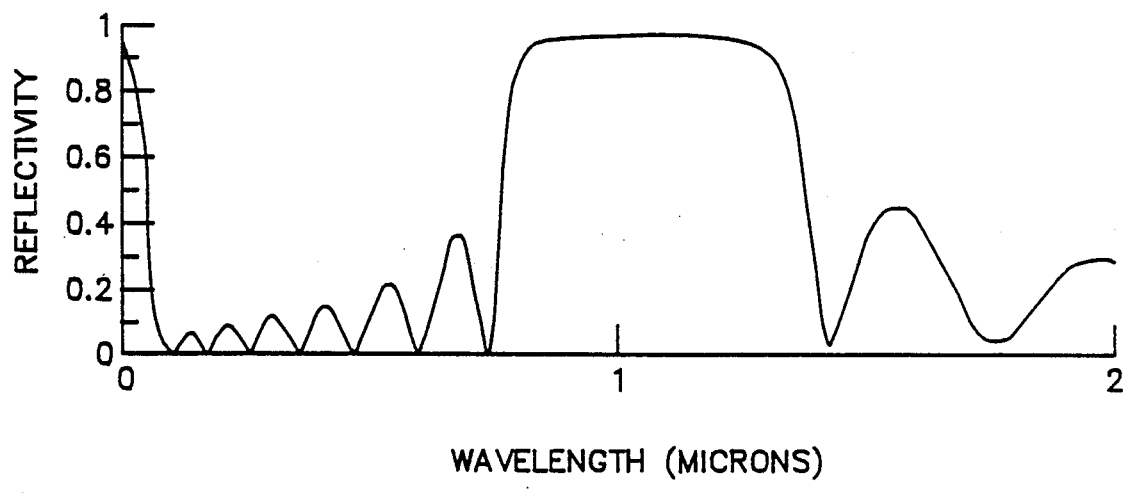
FIG. 2 is a graph plotting reflectivity as a function of wavelength for a typical rugate filter.

In the present invention, broadband spectral monitoring is used to achieve a significant improvement in the measurement and control of the refractive index of a thin film during the deposition process. This technique can best be explained by illustrating its application to the deposition of a rugate filter, although those skilled in the art will appreciate that the invention is more broadly applicable to the deposition of any optical coating having a gradient refractive index, whether continuous, stepped, or digital. A rugate filter is a gradient index structure having a sinusoidal refractive index profile. For example, FIG. 1 is a plot of refractive index as a function of thickness for a small portion of a rugate filter. The properties of such a filter are determined by the values of the average refractive index ($N_a$) and the peak-to-peak modulation of the refractive index ($N_p$). The refractive index as a function of thickness, N(t), is given by:

$$N(t) = N_a + \tfrac{1}{2} N_p \sin(2\pi t/P),$$

where P is the modulation period of the refractive index profile. The rugate filter will strongly reflect light at a wavelength of $\lambda_o = 2 N_a P$, as illustrated in FIG. 2, which is a plot of the reflectivity of a typical rugate filter as a function of wavelength.

A feature of rugate filters is that the thin film reflectance in wavelength regions away from the central reflection band of the filter corresponds to the reflectance of a single homogeneous layer having a refractive index of $N_a$, the average rugate index. As a result, the positions of the sidelobes in the reflection profile of the filter depend on the optical thickness $O_t$, rather than on the average refractive index $N_a$. The single layer model for reflectance is given by:

$$R = [P_1 + \cos(4\pi O_t/\lambda)] / [P_2 + \cos(4\pi O_t/\lambda)],$$

where $$P_1 = (r_f^2 + r_b^2) / (2 r_f r_b),$$

$$P_2 = (1 + r_f^2 r_b^2) / (2 r_f r_b), \text{ where}$$

b the Fresnel reflection coefficients are $$r_f = (1 - N_a) / (1 + N_a),$$

$$r_b = (N_a - N_s) / (N_a + N_s), \text{ and where}$$

$N_s$ is the index of refraction of the substrate and $\lambda$ is the wavelength of the light at which the reflectance is measured. Thus, the optical thickness ($O_t$) of the layer being deposited may be obtained by measuring the reflectance (R) of the thin film at wavelengths away from the reflection band of the filter.

Figure 3:
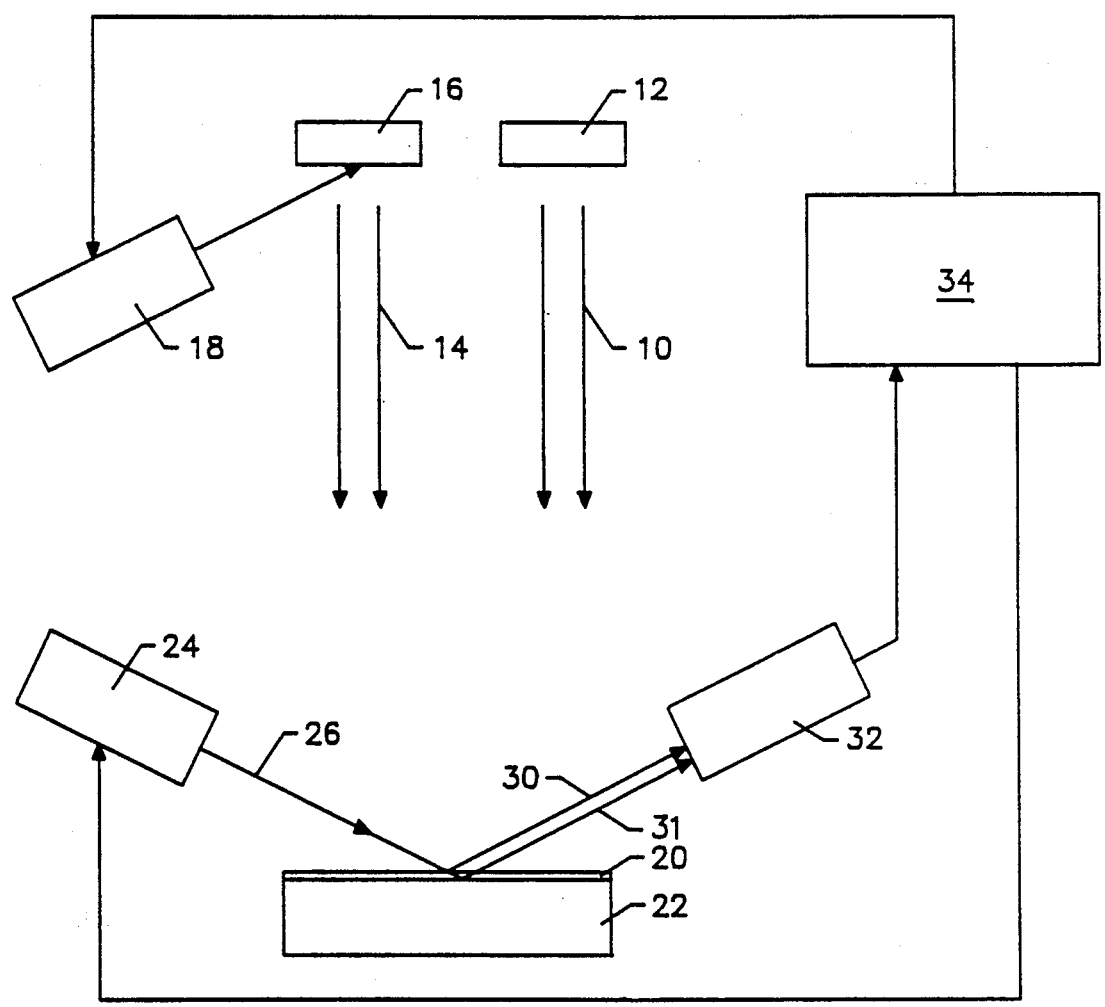
FIG. 3 is a schematic diagram of a thin film deposition and monitoring apparatus of the present invention.

FIG. 3 is a schematic diagram illustrating a thin film deposition and monitoring apparatus that may be used to practice the present invention. A first dielectric material 10 is evaporated, as by electrical resistance heating, for example, from a first source of material 12. A second dielectric material 14 is evaporated from a second source of material 16 by a controllable source of energy 18, such as an electron beam gun. The evaporated materials 10 and 14 are codeposited in a thin film layer 20 on a substrate 22. A broadband light source 24 is used to direct a beam of light 26 to be incident on the layer 20 and the substrate 22. Light 30 reflected by layer 20 and light 31 reflected by substrate 22 form an interference pattern comprising the thin film reflectance spectrum that is sensed by a monochrometer 32.

A computer 34 is used to control the deposition and monitoring apparatus. Prior to beginning the deposition of a thin film layer, a predetermined refractive index profile specified for the layer is stored in the memory of computer 34. Furthermore, controllable energy source 18 is calibrated so that the refractive index produced by the mixture of evaporated materials 10 and 14 codeposited on substrate 22 is a known function of the control signal provided by computer 34 to energy source 18. As the deposition process proceeds, computer 34 receives signals from monochrometer 32 that correspond to the thin film reflectance spectrum.

Using the reflectance spectrum detected by monochrometer 32, computer 34 calculates a current optical thickness estimate for layer 20. Next, the refractive index specified by the predetermined profile for that optical thickness of the film is calculated. Computer 34 then provides a control signal to drive energy source 18 so that the mixture of evaporated materials 10 and 14 produces the specified refractive index for the current optical thickness. This process is repeated continuously until deposited layer 20 corresponds to the specified refractive index profile. Deposition is terminated when the total predetermined optical thickness is achieved.

Figure 4:
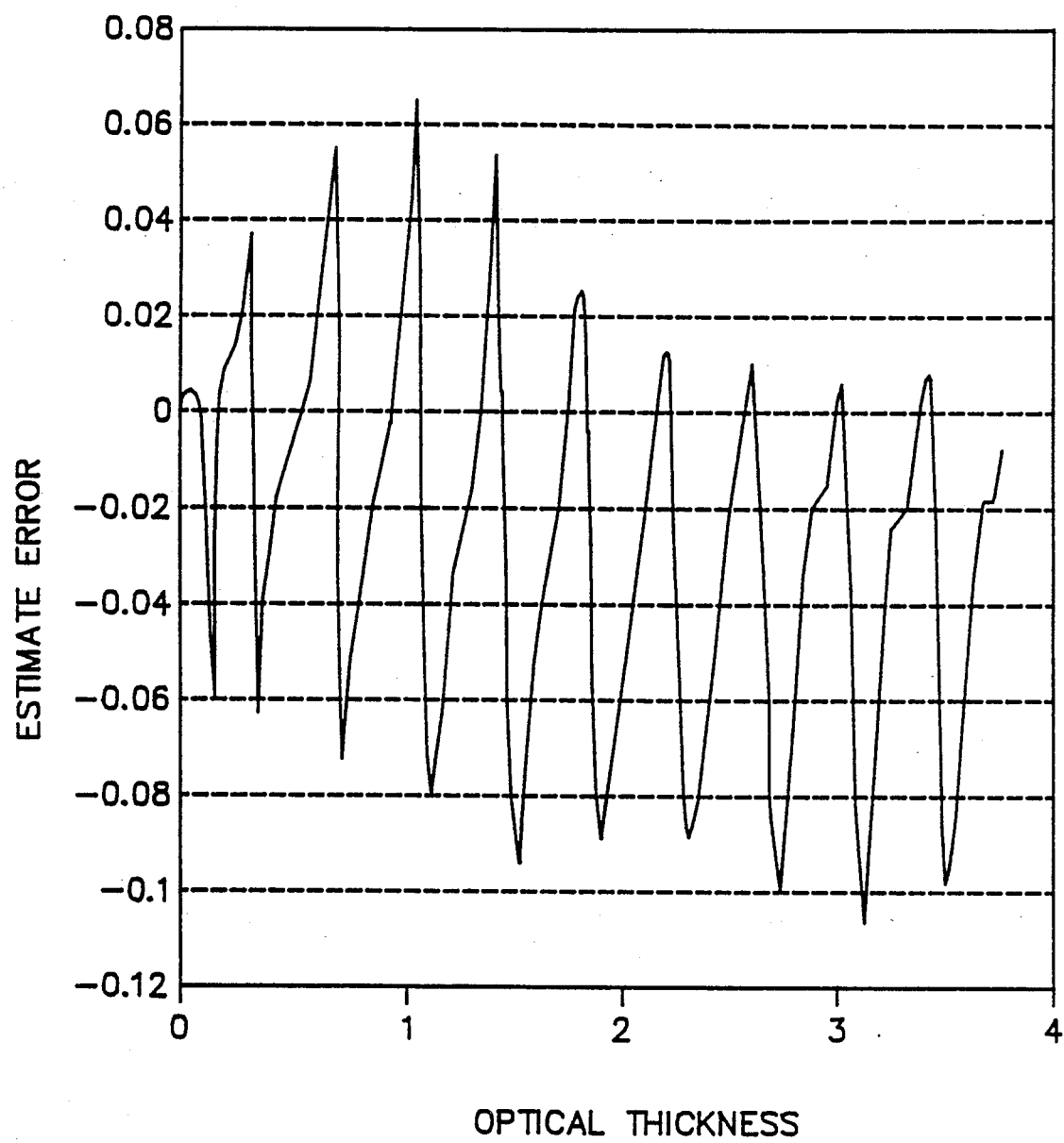
FIG. 4 is a graph plotting optical thickness estimate error as a function of optical thickness for the method of the present invention.

FIG. 4 is a plot of the thickness estimate error of computer 34 as a function of optical thickness for a typical thin film deposited with the apparatus of FIG. 3. The crossing of the thickness estimate error through zero indicates that the method is self compensating for several types of errors, including any drift in the measured reflectance signal. At the start of a film deposition run, the operator can insert a starting optical thickness estimate, or computer 34 can generate an initial estimate based on previous history. Experiments have shown that when the starting estimate is within a quarterwave of the correct optical thickness, the optimization program of computer 34 finds the correct solution. When the film thickness exceeds approximately the first quarterwave point, computer 34 generates an accurate thickness estimate even when the reflectance signal is corrupted.

The typical rugate deposition process illustrated in FIG. 3 holds the rate of deposition constant for the low index material 10 and varies the rate for the high index material 14 so as to achieve the correct refractive index modulation in the deposited film. The broadband spectral monitor of the present invention measures the optical thickness of the film, and computer 34 uses the thickness measurement to control the deposition rate of high index material 14 assuming a constant deposition rate of low index material 10. If the deposition rate of low index material 10 were to drift downward, for example, the deposited film would be rich in high index material 14, thereby causing an increase in the average refractive index as time proceeds. However, because the refractive index modulation produced by the present invention is a function of the total optical thickness measurement and not of the average index of refraction, the refractive index modulation remains correct for the rugate deposition. Experiments have also shown that the present method will produce acceptable rugate deposition even with gross errors in the knowledge of the refractive index values of the depositing materials. If computer 34 is programmed with a close initial estimate and appropriate parameter bounds, the method is self-correcting to deposit a film having an acceptable refractive index modulation profile.

The broadband monitor of the present invention provides a continuous output beginning with zero film thickness on a known bare substrate. Incident light from one spectral region can be used to satisfactorily measure the optical thickness of a depositing layer that has important characteristics in another spectral region. Thus, many different wavelengths in the spectral scan can be measured to provide noise averaging. When used with an appropriate fitting algorithm, the broadband spectral monitor is also capable of fabricating gradient index films in the presence of gross errors such as reflectance signal variations, deposition rate drifts for the low index material, and uncertainties in the index values of the coevaporated materials.

Although the present invention has been described with respect to a specific embodiment thereof, various changes and modifications may be suggested to one skilled in the art. In particular, the present method is suitable for measuring and controlling the deposition of a single evaporant and for producing optical films having continuous, stepped, or digital refractive index profiles. Therefore, it is intended that the present invention encompass such changes and modifications as fall within the scope of the appended claims.

We claim:

1. A method of fabricating a gradient index optical film having a specified refractive index profile, comprising the steps of:
   providing a first optical material having a fist refractive index;
   providing a second optical material having a second refractive index;
   evaporating said first material at a predetermined rate and said second material at a controllable rate;
   depositing said first and second evaporated materials on a substrate to form a layer having a refractive index determined by a relationship between said controllable and predetermined rates of evaporation;
   illuminating said layer and substrate with a broadband light source;
   detecting a reflectance spectrum comprising an interference pattern produced by reflection of said broadband light from said layer and substrate;
   estimating an optical thickness of said layer by fitting said detected reflectance spectrum to a single layer model of reflectance;
   comparing said reflectance spectrum to a reflectance specified for the film by the refractive index profile at said estimated optical thickness; and
   adjusting said controllable rate of evaporation of said second material to cause the refractive index of said layer to conform to the predetermined refractive index profile of the film.

2. The method of claim 1, wherein said first refractive index is less than said second refractive index.

* * * * *